May 9, 1950 K. POSTHUMUS 2,507,176
RECEIVER FOR PULSE MODULATED WAVES
Filed May 1, 1946
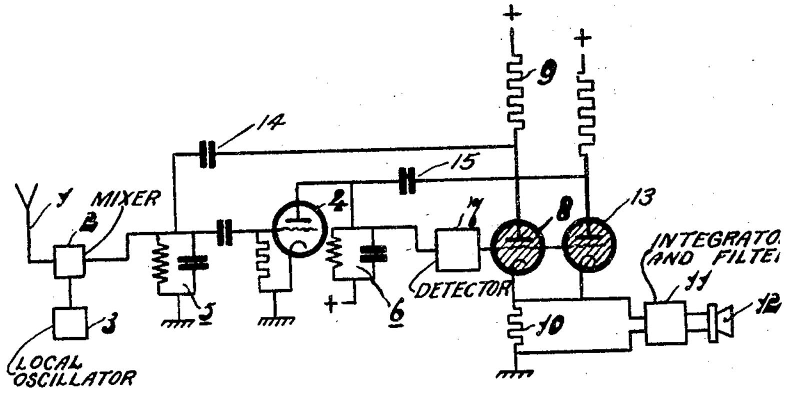
INVENTOR
KLAAS POSTHUMUS
BY [signature]
AGENT Patented May 9, 1950

2,507,176

UNITED STATES PATENT OFFICE 2,507,176

RECEIVER FOR PULSE MODULATED WAVES

Klaas Posthumus, Eindhoven, Netherlands, assignor to Hartford National Bank and Trust Company, Hartford, Conn., as trustee Application May 1, 1946, Serial No. 666,241
In Belgium March 15, 1945

Section 1, Public Law 690, August 8, 1946
Patent expires March 15, 1965

5 Claims. (Cl. 250—20)

The invention relates to a device for receiving signals transmitted by means of a carrier wave modulated by identical impulses spaced in time in accordance with the instantaneous value of the amplitude of the desired signal to be transmitted. It has been proposed to employ so-called impulse-frequency and impulse-phase modulation for retransmitting signals by means of a modulated carrier wave. With these methods of modulation the carrier-wave is modulated by identical impulses, whose number per unit of time in the case of impulse-frequency modulation depends upon the instantaneous value of the amplitude of the signal to be transmitted, and with impulse-phase modulation the number of impulses per unit of time is constant, but the time interval between impulses varies in accordance with the instantaneous value of the amplitude of the signal to be transmitted.

In order that an impulse-frequency modulation system provide a highly interference-free transmission of a signal having a maximum frequency, of, say, 10,000 c./s. and a variable amplitude, it is desirable that about 10 impulses should be transmitted per cycle of the highest signal frequency, resulting in an impulse frequency of a maximum value of 100,000 c./s. It is known that interference is lessened as the impulses more nearly approximate a rectangular form and in order to obtain a rectangular form during transmission it is necessary that a number of harmonics of the fundamental frequency of the impulses be transmitted. It is common practice to transmit up to the tenth harmonic, so that the maximum frequency to be transmitted is $10\times100{,}000=10^6$ c./s.

The total band-width required for transmission is $2\times10^6$ c./s. and is consequently very large compared with that of other systems, for example, frequency-modulation, in which a band-width of $2\times10^5$ c./s. is sufficient for transmitting a signal of $10^4$ c./s. However, it has been found that impulse with a band-width of $2\times10^6$ c./s. the interference is much less than when using a frequency-modulation system having a band-width of $2\times10^5$ c./s. The same holds in comparing frequency modulation with a system involving impulse-phase modulation.

After the foregoing it might be expected that the use of impulse modulation, with a band-width customary for frequency-modulation, should permit interference suppression substantially corresponding to that of frequency-modulation. In this case, with an interference-free system having impulse-frequency modulation the band-width should be about $2\times10^6$ c./s. for the above-mentioned system, the band-width need only be $2\times10^5$ c./s. to transmit only the fundamental frequency.

It has been found, however, that when using a transmitter having a narrow band-width not exceeding that which is used in frequency-modulation, $2\times10^5$ c./s., satisfactory reproduction is not obtained in a receiver having the corresponding band-width.

The invention is based on the recognition that this is due to the slight damping of the selective circuits of the receiver which are tuned to the carrier wave or converted carrier-wave, owing to which each incoming carrier-wave impulse produces an oscillation of more than one cycle, that is, a dying down phenomenon of comparatively long duration. Thus the incoming impulse will not produce in the receiver a single impulse, but instead thereof each incoming impulse produces a plurality of impulses and since the signal reproduced depends on the number of impulses per unit of time or on the distance between the impulses, a false signal is reproduced. In this respect it is pointed out that it is known per se that on receiving carrier-waves modulated by Morse signals dying down phenomena in very selective circuits may cause unsatisfactory reproduction of the incoming signals. To avoid these disadvantages it has been proposed to transmit the carrier-wave, immediately after termination of a carrier-wave pulse, in phase opposition for a short time to damp the dying down phenomena occurring in the receiver circuits. However, this solution of the problem is objectionable in various respects inter alia in connection with the increased transmitter load and the necessity of matching the transmitter and the receiver exactly together.

According to the invention, in order to avoid the disadvantages due to dying-down phenomenon inherent to the use of a resonant circuit which forms part of the receiving cascade and is tuned to the modulated carrier-wave, a variable damping resistance is connected in parallel with said resonant circuit, which resistance is controlled in accordance with the incoming pulses in a manner such that every time after the occurrence of an incoming pulse the damping of the resonant circuit is temporarily increased.

A receiver equipped according to the invention may furthermore be used for the reception of signals with which certain harmonics are transmitted as well as the fundamental frequency of the impulses. These harmonics are suppressed in the receiver, it is true, but since they are not essential for the correct reproduction of the signal it does not form an impediment to satisfactory reception. It is true that in this case the interference-freedom obtained is inferior to that secured by means of a signal thus transmitted, but, as has already been said, it is satisfactory that the interference encountered is at least no worse than that of the common frequency modulation systems.

It is pointed out that a receiver for impulse-modulation with a small band-width, as described hereinbefore, may also be used for the reception of impulse-modulation with which a larger band-width is transmitted, so that in addition to the fundamental frequency of the pulses higher harmonics, for example, up to and inclusive of the 10th harmonic are transmitted. Since, however, these higher harmonics, which are in themselves not essential to correct reproduction of the transmitted signal, are suppressed in the receiver, one does not obtain the interference suppression corresponding to the large band-width at the transmitter, but only interference suppression corresponding to the comparatively small band-width at the receiver. However, this loss of interference suppression is compensated by the advantage that owing to the smaller band-width of the receiver with the same sensitivity, the required number of amplification stages is smaller than in a receiver with a large band-width.

In using an impulse-repeater controlled by the incoming pulses through the intermediary of a threshold device, a particularly suitable construction is obtained if, according to the further invention, the damping resistance consists of a preferably gasfilled discharge tube which is connected as a pulse generator and normally cut off, which tube is released on the occurrence of an incoming pulse and then produces so-called repeated pulse, the duration and amplitude of which are independent of the incoming pulse.

In order that the invention may be clearly understood and readily carried into effect, it will now be set out more fully with reference to the accompanying drawing, given by way of example, whose sole figure shows diagrammatically one form of construction of a receiver for impulse-frequency modulation.

In the form of construction shown in the drawing the oscillations picked up by an antenna 1 are supplied to a mixing tube 2 along with oscillations generated by a local oscillator 3. The modulated intermediate-frequency carrier-oscillation appearing in the mixing tube is supplied to an intermediate-frequency amplifier which comprises a discharge tube 4 and two selective circuits 5 and 6 which are damped to such a small degree that each incoming pulse involves an oscillation of more than one period in these circuits that is, each pulse, after its termination, involves a dying down phenomenon of comparatively long duration. The receiver cascade further comprises a detector 7 in which the modulated intermediate frequency oscillations are converted into impulses whose number per unit of time depends upon the instantaneous value of the amplitude of the incoming signal. In order to ensure a maximum interference suppression detector 7 is preferably constructed in a manner that only pulses whose amplitude exceeds a definite threshold value appear in the output circuit. Reproduction independent of the form and magnitude of pulses in the output circuit of detector 7 is obtained by applying these pulses to a reproducing device 12 via a so-called local pulse generator. In the form of construction shown in the drawing the local pulse generator comprises a normally cut-off, grid-controlled gaseous discharge tube 8, to whose grid the detected impulses are applied. The anode circuit includes a resistor 9 through which a high positive voltage is supplied to the anode. The cathode lead includes a resistor 10. This pulse generator operates as follows: when an implse of positive polarity appears on the grid of the tube 8 this tube becomes conductive, as a result of which a current flows through the resistor 10. However, after ignition of tube 8, the anode voltage of this tube falls off so that the tube is extinguished shortly after ignition and consequently a current pulse whose form and magnitude depend on the proportioning of the components of the pulse generator flows through resistor 10. Consequently the impulses across the resistor 10 are essentially independent of interferences which affect the form and magnitude of the incoming pulses. However, the number of pulses per unit of time is determined by the number of pulses applied to tube 8.

The new impulses thus obtained are supplied through an integrating and filtering device 11 in which they are added and are applied to a reproducing device, for example a loudspeaker 12.

By the device as thus far described, each incoming impulse involves an oscillation of more than one cycle in the circuits 5 and 6, and a false signal will be produced, unless measures are taken to suppress the cycles subsequent to the first cycle of the oscillation generated by each incoming impulse in the selective circuits 5 and 6. The form of the pulses taken from the detector 7 corresponds to the enveloping curve of the oscillations appearing in circuit 6. On surpassing a given threshold value which, as stated hereinbefore, has for its purpose to increase the interference suppression of the arrangement, tube 8 is ignited so that a repeated pulse appears across resistor 10. After a short time determined by the time constant of the pulse generator, tube 8 has resumed the initial state. Due to dying down phenomena of comparatively long duration in the oscillation circuits 5 and 6 with a small band-width and consequently slight damping of these circuits it happens that the voltage taken from the detector 7 still has such value at the last-mentioned instant that the impulse generator again becomes operative in the time interval between two incoming pulses and consequently the incoming signal is incorrectly reproduced because of a pulse being generated, which pulse was not the result of an incoming signal pulse. False reproduction of the incoming signal is avoided by limiting the comparatively long dying down time of the oscillation circuits 5 and 6 by temporarily increasing the damping resistance of these oscillation circuits after the occurrence of an incoming pulse.

The measure according to the invention, which is illustrated in the drawing, consists in that a grid-controlled gasfilled tube controlled by the incoming pulses or by pulses derived therefrom, is connected in parallel with each of the circuits 5 and 6. As shown in the drawing tube 8 is connected in parallel with the circuit 5 by means of capacitor 14; and circuit 6 is connected in parallel with a tube 13 by means of a capacitor 14. Like tube 8, tube 13 is controlled by the impulses appearing in the output circuit of detector 7. Tubes 8 and 13 are ignited by the control pulses due to which each of the tubes constitutes a short-circuit for the associated resonant circuit. Tubes 8 and 13 connected in parallel with the oscillation circuits 5 and 6 comprise parallel-connected control-grid circuits and separate anode resistors, which is of importance in order to avoid unwanted coupling of the oscillation circuits 5 and 6 which are at different amplification levels. When an incoming pulse appears in circuits 5 and 6, owing to which an oscillation of more than one cycle could be produced in these circuits, the tubes 8 and 13 are ignited during the first cycle of these oscillations and the circuits 5 and 6 are consequently short-circuited. Further oscillations due to actuation of the circuits by the incoming impulses can thus no longer occur, so that each incoming impulse only leads to a single impulse in the receiver.

What I claim is:

1. A circuit arrangement for receiving a carrier wave modulated by pulses spaced in time in accordance with the amplitude of an intelligence signal, comprising means to receive said pulse modulated carrier wave, means to amplify said modulated carrier wave, a resonant circuit tuned to the frequency of the received wave and coupled to said receiving means and a further resonant circuit tuned to the frequency of the received wave and coupled to said amplifying means, a detector coupled to said further resonant circuit, a pulse generator comprising a first and a further normally quiescent grid-controlled gaseous discharge tube, each of said tubes having a grid, a cathode and an anode, said grids being connected in parallel to said detector, a resistor connecting said cathodes to ground, a first anode resistor connected to said first gaseous discharge tube, a further anode resistor connected to said further gaseous discharge tube, said pulse generator being coupled to said detector to produce pulses corresponding to the pulses of said received wave, means to connect said first gaseous discharge tube in parallel with said first resonant circuit and to connect said further gaseous discharge tube in parallel with said further resonant circuit to temporarily increase the damping of the resonant circuits after the reception of each pulse of said modulated carrier wave.

2. A circuit arrangement for receiving a carrier wave modulated by pulses spaced in time in accordance with the amplitude of an intelligence signal, comprising means to receive said pulse modulated carrier wave, means to amplify said modulated carrier wave, said amplifying means comprising a vacuum tube having input and output circuits, a first resonant circuit tuned to the frequency of the received wave and coupled to the input circuit of said vacuum tube and a second resonant circuit tuned to the frequency of the received wave and coupled to the output circuit of said vacuum tube, a detector coupled to the output circuit of said vacuum tube, a pulse generator comprising a first and a second normally quiescent grid-controlled gaseous discharge tube, each of said tubes having a grid, a cathode and an anode, said grids being connected in parallel to the output of said detector, a resistor connecting said cathodes to ground, a first anode resistor connected to said first gaseous discharge tube, a second anode resistor connected to said second gaseous discharge tube, said pulse generator being coupled to said detector to produce pulses corresponding to the pulses of said received wave, means to connect said first gaseous discharge tube in parallel with said first resonant circuit and to connect said second gaseous discharge tube in parallel with said second resonant circuit to temporarily increase the damping of said resonant circuits after the reception of each pulse of said modulated carrier wave, and means to derive a pulsed output potential from the cathode circuit of said gaseous discharge tubes.

3. In apparatus for receiving a transmitted carrier wave modulated by rectangular pulses of brief duration whose time position depends on the instantaneous amplitude of an intelligence signal, an amplifying system for said pulse-modulated wave provided with a resonant circuit tuned to a frequency bearing a predetermined relation to the frequency of said carrier wave, a variable damping resistance element coupled across said resonant circuit, and means coupled to said amplifying system and responsive to the leading edge of each pulse abruptly to decrease momentarily the resistance of said element to dampen said resonant circuit to an extent preventing the production of parasitic pulses.

4. In apparatus for receiving a transmitted carrier wave modulated by rectangular pulses of brief duration whose time position depends on the instantaneous amplitude of an intelligence signal, an amplifying system for said pulse-modulated wave provided with a resonant circuit tuned to a frequency bearing a predetermined relation to the frequency of said carrier wave, a gaseous discharge tube coupled across said resonant circuit, and means coupled to said amplifying system and responsive to the leading edge of each pulse to render said tube momentarily conductive.

5. In apparatus for receiving a transmitted carrier wave modulated by rectangular pulses of brief duration whose time position depends on the instantaneous amplitude of an intelligence signal, an amplifying system for said modulated wave provided with a resonant circuit tuned to a frequency bearing a predetermined relation to the frequency of said carrier wave, a grid-controlled gaseous discharge tube coupled across said resonant circuit, a detector coupled to said amplifying system to rectify said pulses, and means to apply said rectified pulses to the grid of said tube and to fire said tube momentarily in response to the leading edge of each of said rectified pulses.

KLAAS POSTHUMUS.

REFERENCES CITED

The following references are of record in the file of this patent:

UNITED STATES PATENTS

| Number | Name | Date |
|---|---|---|
| 1,687,061 | Bellescize | Oct. 9, 1928 |
| 1,744,618 | De Bellescize | Jan. 21, 1930 |
| 2,030,120 | Rust | Feb. 11, 1936 |
| 2,273,193 | Heising | Feb. 17, 1942 |
| 2,326,584 | Van Zelst | Aug. 10, 1943 |
| 2,337,196 | Hollingsworth | Dec. 21, 1943 |
| 2,416,286 | Busignies | Feb. 25, 1947 |
| 2,421,025 | Grieg | May 27, 1947 |
| 2,434,920 | Grieg | Jan. 27, 1948 |

FOREIGN PATENTS

| Number | Country | Date |
|---|---|---|
| 442,626 | Great Britain | Feb. 12, 1936 |